United States Patent [19]

Medlin

[11] 4,336,644
[45] Jun. 29, 1982

[54] METHOD OF INSTALLING BULLETPROOF WINDOWS IN AN ARMORED AUTOMOBILE

[76] Inventor: Richard C. Medlin, 6940 NW. 14th Ave., Ft. Lauderdale, Fla. 33309

[21] Appl. No.: 219,882

[22] Filed: Dec. 24, 1980

Related U.S. Application Data

[63] Continuation-in-part of Ser. No. 920,715, Jun. 30, 1978.

[51] Int. Cl.³ .............................. F41H 7/04; B60J 1/00
[52] U.S. Cl. .................................... 29/401.1; 52/208; 89/36 L; 296/84 R
[58] Field of Search ......................... 29/401.1, 401.01; 89/36 L, 36 H; 296/84 R, 84 A, 84 D, 84 K; 52/208, 397, 400

[56] References Cited

U.S. PATENT DOCUMENTS

| | | | |
|---|---|---|---|
| 2,226,833 | 12/1940 | Rider | 89/36 L |
| 3,581,621 | 6/1971 | Bauer | 89/36 L |
| 3,855,898 | 12/1974 | McDonald | 89/36 L |
| 4,132,446 | 1/1979 | Bauer | 89/36 H |
| 4,139,234 | 2/1979 | Morgan | 52/208 |

Primary Examiner—Gene Crosby
Attorney, Agent, or Firm—Gunn, Lee & Jackson

[57] ABSTRACT

Methods of installing bulletproof front and/or rear windshields of an armored automobile are disclosed. A first method involves rebuilding the window frame of the automobile, installing the bulletproof windshield, then recontouring the surface of the automobile adjacent the rebuilt window frame so the automobile again appears to an observer to be an ordinary automobile. A second method involves removing the standard windshields from an ordinary automobile, refitting the automobile with a mechanism having a lip of sufficient depth to retain a bulletproof windshield, inserting a bulletproof windshield and subsequently restoring the outer surface of the automobile adjacent the window frame to the profile of an ordinary automobile.

9 Claims, 22 Drawing Figures

METHOD OF INSTALLING BULLETPROOF WINDOWS IN AN ARMORED AUTOMOBILE

This application is a continuation-in-part of U.S. patent application Ser. No. 920,715 filed June 30, 1978 having the same inventor, which is hereby incorporated by reference.

BACKGROUND OF THE INVENTION

This invention relates to armored vehicles and, more particularly, to either a method of retrofitting a standard automobile to make it a lightweight armored vehicle or building a new lightweight armored vehicle. The passenger compartment is encapsulated in bulletproof windows, rigidly formed woven polyglass fibers embodied in an epoxy resin, and ballistic nylon or Kevlar material to prevent penetration by projectiles normally used in case of attack.

BRIEF DESCRIPTION OF THE PRIOR ART

Prior to the present invention, modifying a standard automobile to give it armor protection involved retrofitting the automobile with one-quarter inch tungsten steel plate armor, securing inside of the automobile a layer of bullet resistant polycarbon laminate inside of the side windows, and installing a bulletproof front and rear window. Such a procedure detracted from the appearance of the automobile, plus increased the weight of the automobile by approximately 2800 pounds. The increased weight made the automobile difficult to handle, plus placed excess strain on the drive train thereby requiring the installation of a heavy duty transmission, rear axle drive unit and suspension system. The bolting of the bullet resistant polycarbon laminate inside of the side windows of the automobile detracted from its normal appearance, plus revealed to would-be terrorists or kidnappers that the automobile was armored. One of the most desirable features of the present armored vehicle is that it appears to be an ordinary vehicle thereby not attracting attention of the public.

While the manufacturers of luxury automobiles have in the past offered armored vehicles as standard equipment, a luxury automobile itself attracts consideration attention that would not be caused by a smaller type vehicle. Further, the luxury vehicles have the attendant disadvantage of increased weight due to tungsten steel plating contained therein, and the resultant lack of maneuverability. Even the luxury automobiles do not have the many features of the present automobile, plus the reduced weight.

SUMMARY OF THE INVENTION

It is an object of the present invention to provide a lightweight armored type vehicle.

It is another object of the present invention to retrofit a standard automobile with lightweight bulletproof armor and still maintain an outward appearance of a standard automobile.

It is a further object of the present invention to provide a method of installing bulletproof front and/or rear windows of an armored automobile by removing the original windows, installing a new type of window frame to secure the bulletproof window in place, then recontouring and refinishing the automobile if necessary to produce an armored automobile that superficially appears to be an ordinary automobile.

A standard automobile is first stripped of its interior. Next, the window mechanisms are removed and a support system installed in the doors for supporting a Lexgard laminate and safety plate glass in a rigid closed position. The door frames are rebuilt to receive and seal with the newly formed side windows. The frames are also filled with bullet resistant material. The front and rear window frames are reconstructed to receive a bulletproof window therein comprising a bullet resistant glass and polycarbon laminate. The external appearance of the automobile remains essentially unchanged.

Vertical portions of the automobile, including the doors, side walls, fire wall and rear seat area, are retrofitted with a multiple layer woven polyglass material rigidly formed with a resin-catalyst mixture. Additional bullet resistant strength is provided by multiple layers of ballistic nylon or Kevlar attached to the rigid woven polyglass. Flat areas of the automobile, such as the top or bottom (which are not normally subject to perpendicular penetration by bullets or other projectiles during an attack) are equipped with multiple layers of ballistic nylon to prevent the reflection of projectiles therethrough. The ballistic nylon or Kevlar is secured in position by a silicone sealant. Any possible paths of entry of a projectile into the protective area of the passenger compartment of the automobile are protected by the rigid woven polyglass and/or the ballistic nylon to the degree necessary to withstand normal attacks.

To prevent possible explosion, the fuel tank is wrapped in ballistic nylon and the battery is encased in a woven rigid polyglass structure. To prevent deterioration of the Kevlar as may be caused by moisture, the Kevlar is encapsulated in an impermeable material, such as a layer of plastic, to prevent moisture contact therewith. The Kevlar, which is sewn together in multiple layers, is rigidly attached to the woven rigid polyglass by a suitable bonding material, such as silicone construction sealant 1400 manufactured by General Electric Company. The stitching of the ballistic nylon or Kevlar prevents separation of the layers in the event of penetration by a projectile. If bullets are fired into the side of the door, the layers of woven rigid polyglass will flatten and/or disperse the projectile over a larger area with the interior multiple layers of Kevlar catching any remaining fragments from the projectiles. Consequently, none of the projectile will enter the protected area of the passenger compartment. The safety plate glass gives additional strength to the side windows when used in combination with the polycarbon laminate.

The front and rear windows are manufactured by Pittsburg Plate Glass Company and include an inner $\frac{1}{4}$ inch layer of bullet resistant polycarbon laminate and an outer $\frac{3}{4}$ inch layer of bullet resistant glass. Lexgard is a transparent bullet resistant sheet manufactured by General Electric Company. The ballistic nylon is manufactured by the Amerbelle Corporation in Rockville, Conn. Kevlar, an aromatic polyamide material which is much more expensive than ballistic nylon but has higher bullet resistant strength, is manufactured by J. P. Stevens Company. Kevlar will deteriorate if subjected to moisture, as will the ballistic nylon, but not as rapidly. Therefore, it must be protected against moisture. The fiberglass used in forming the rigidly woven polyglass panel is woven glass roving style 775 manufactured by Fiber Glass Industries Incorporated, Amsterdam, N.Y.; however, others could be used provided they give the strength desired. A resin-catalyst presently being used to form the rigid woven polyglass panel is methyl ethyl ketone peroxide in dimethyl phthalate sold under the name Cadox M-105 by Noury Chemical Corporation in Burt, N.Y.; however, other resins could be used.

DESCRIPTION OF THE PREFERRED EMBODIMENT

Figure 1:
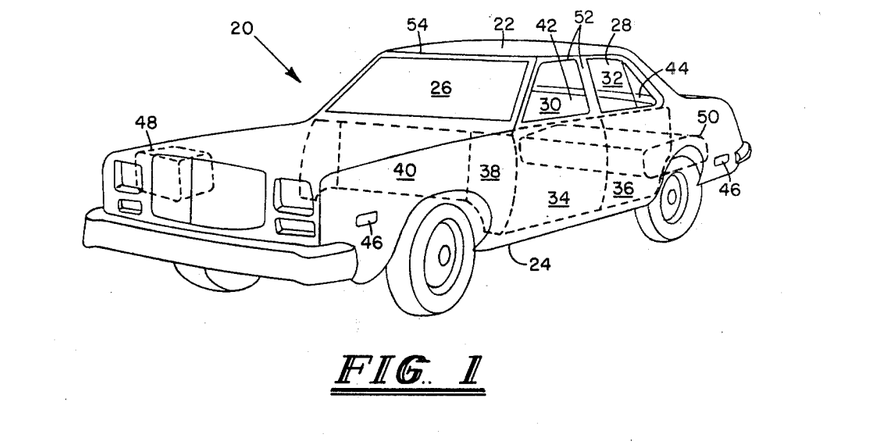
FIG. 1 is a perspective view of a standard automobile retrofitted with lightweight armor.

The automobile represented generally by reference numeral 20 as shown in FIG. 1 appears to be a standard size American automobile somewhere below the luxury line of vehicles. However, sight can be deceiving because the automobile 20 has been retrofitted to be an armored vehicle. For example, the top 22 has installed in the headliner a 24-ply ballistic nylon, as well as the floor panel 24. The windshield 26 and the rear window 28 have special built frames that receive bullet-proof glass and bullet-resistant polycarbon laminate therein. The front and rear door windows 30 and 32, respectively, have been replaced with safety plate glass and a bullet-resistant polycarbon laminate.

Installed inside of the front and rear doors is a lightweight woven polyglass material rigidly formed by a resin-catalyst mixture with an innerline of 24-ply Kevlar. The side kick panels contain a 7-ply rigid woven polyglass in combination with a 24-ply ballistic nylon, and if necessary, multiple layers of rigidly formed woven polyglass. The back panel 42 and package tray 44 are reinforced with 18-ply rigidly formed fiberglass. If additional bullet-resistant strength is felt to be necessary, multi-layers of Kevlar may be included therein. A tear gas dispersal system is contained behind reflectors 46. To provide additional or less strength, either more or less layers of ballistic nylon, Kevlar or polyglass may be used.

To still supply electrical power to the vehicle in case the engine is disabled, dual batteries are provided, which batteries are housed in an 18-ply rigidly formed fiberglass battery box 48. To prevent explosion of the gas tank 50, the gas tank 50 is wrapped in a 30-ply ballistic nylon. The door frames 52 are built to receive the rear and front door windows 32 and 30 therein as will be explained in more detail subsequently. Front and rear window frames 54 extend outward from the automobile 20 to receive the new windshield 26 and rear window 28 with the body portion of the automobile 20 being reformed, contoured and painted.

Figure 2:
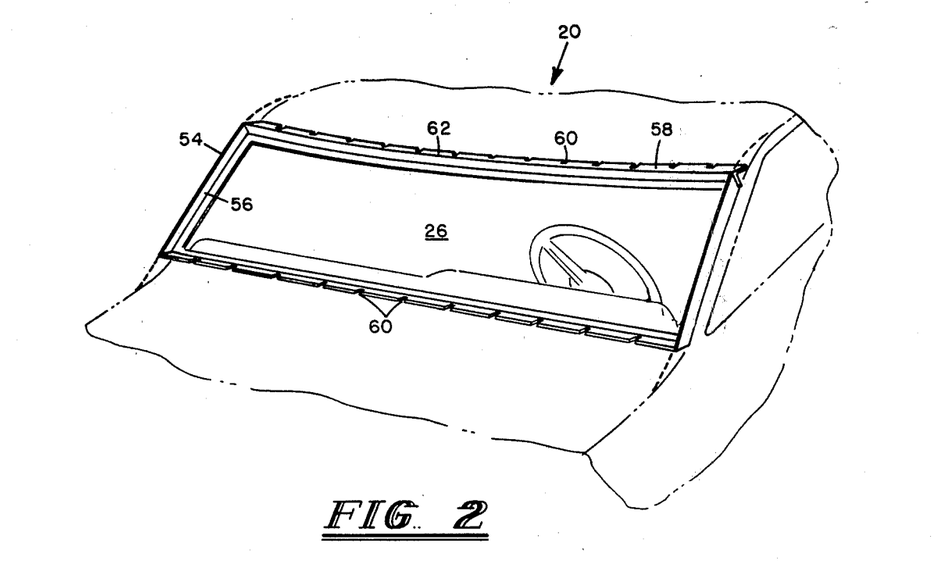
FIG. 2 is a perspective view of a new frame for a windshield to receive a bulletproof window therein with an automobile being shown in reference lines.

Referring now to FIG. 2 of the drawings, the front and rear window frames 54 are shown in a perspective view with the car 20 being shown in reference lines. The new contour of the automobile adjacent to the window frame 54 is shown in dotted lines. The window frame 54 is formed from angle iron having an acute angle (see FIG. 5). The window abutting portion 56 of the window frame 54 extends basically perpendicular to the outer surface of the windshield 26 and in a contiguous parallel relationship to the edges of the windshield 26. It is necessary to extend the depth of the frame normally holding the windshield 26 therein due to the increased thickness of the new windshield formed from safety plate glass and a polycarbon laminate. The outer support portion 58 of the window frame 54 is notched by cuts 60 extending from the outer edge to a close proximity with the window abutting portion. The notches provided by cuts 60 allow for bending to form the window frames 54. After the window frames have been formed, the cuts 60 are welded to provide a secure window frame 54. The entire window frame 54 is then welded to the body of the automobile 20. Rough surfaces that may interfere with the insertion of the windshield 26 or rebuilding of the body of the automobile 20 are ground smooth. The contour of the body of the automobile 20 is then reformed by any conventional means, such as body putty, to extend to the outer edge 62 of the window frame 54. The new contour of the body of the automobile 20 is represented by dotted lines in FIG. 2.

Figure 3:
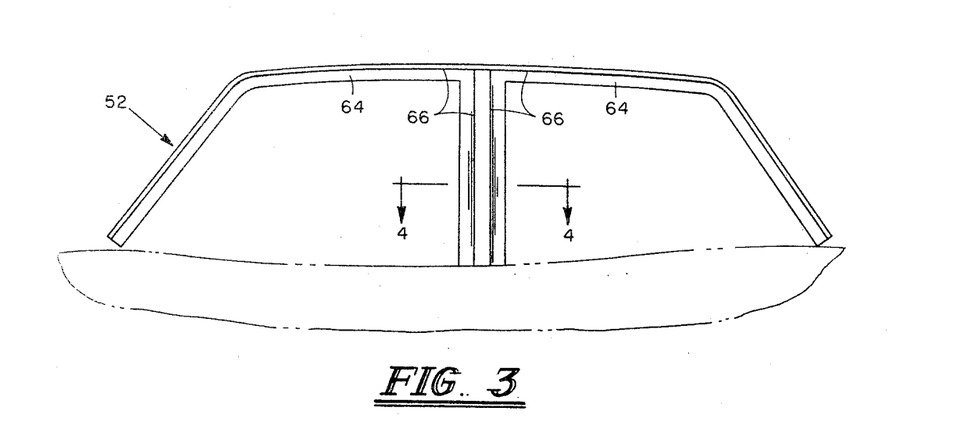
FIG. 3 is an elevated side view of a new door frame to receive a bulletproof window therein.
Figure 4:
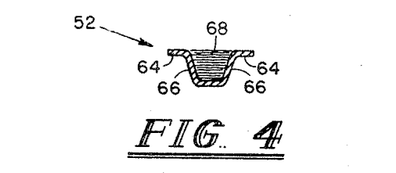
FIG. 4 is a cross-sectional view of FIG. 3 along section lines 4—4.

Referring now to FIGS. 3 and 4 in combination, the door frames 52 as previously shown in FIG. 1 will be explained in more detail. Assume that the front and rear door windows 30 and 32 have not been installed. The door frame 52 has a flat vertical interior surface 64 against which windows 30 and 32 seal. The outwardly extending surfaces 66 are parallel to and contiguous with the edges of the windows 30 and 32. The center post portion of the door frame 52 is filled with a lightweight bullet resistant material 68, such as multi-layers of Kevlar.

Figure 6:
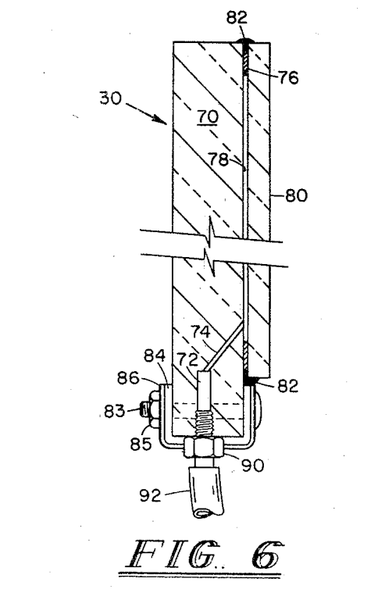
FIG. 6 is an elevated sectional view of a typical side window of the retrofitted armored vehicle shown in FIG. 1.
Figure 7:
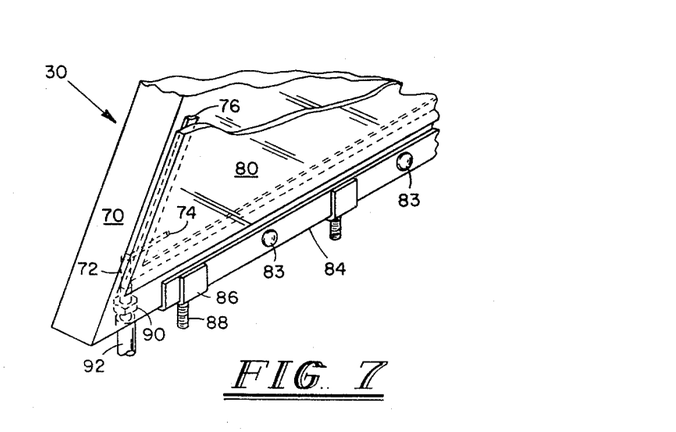
FIG. 7 is a typical perspective view of a lower front corner of a front side window of the vehicle shown in FIG. 1.

Referring to FIGS. 6 and 7 of the drawings in combination, the structure of the front door window 30, which is generally the same as all side windows, is shown in more detail. First, a polycarbon laminate 70 is cut to the general shape of the space provided for the window in door frames 52. The polycarbon laminate 70 is typically sold under the name Lexgard. The polycarbon laminate 70 has a threaded hold 72 formed in the lower edge thereof with a slanted hole 74 connecting the threaded hole 72 with the outer surface of the polycarbon laminate 70. A double-sided tape 76 is applied to the outer surface 78 of the polycarbon laminate 70 around the periphery thereof. A safety plate glass 80 having the same general flat dimensions as the polycarbon laminate 70, except it does not extend downwardly as far, is attached to the opposite side of the double-sided tape 76 which is approximately 1/16th of an inch thick. Next, the outer edge between the polycarbon laminate 70 and the safety plate glass 80 is sealed with a silicon-type sealant 82.

The lowermost portion of the polycarbon laminate 70 is fitted inside of a channel 84 as shown in FIGS. 6 and 7. The channel 84 may be attached to the polycarbon laminate 70 by any suitable means, such as cross bolts 83 and nuts 85. A mounting bracket 86 having a rigidly secured mounting bolt 88 therein is attached to the channnel 84 by any suitable means, such as welding. The mounting bolts 88 extend downwardly from respective mounting brackets 86 on the channel 84.

After the window 30 formed as shown in FIGS. 6 and 7, it is allowed to set for 24 hours. The space between the polycarbon laminate 70 and the safety plate glass 80 is filled with a lower pressure nitrogen via valve fitting 90. The valve fitting 90 is connected via a tube 92 to a low pressure nitrogen container (not shown), which would normally be inserted inside of the door panel. The purpose of the nitrogen is to act as a drying agent to prevent clouding between the polycarbon laminate 70 and the safety plate glass 80. Also, the space therebetween is necessary to provide for the different rates of expansion between the polycarbon laminate 70 and the safety plate glass 80. In this preferred embodiment, the safety plate glass 80 would typically be $\frac{1}{4}$th of an inch thick, and the polycarbon laminate 70 approximately $1\frac{1}{4}$ inches thick.

Figures 8, 9, 10, 11, 12:
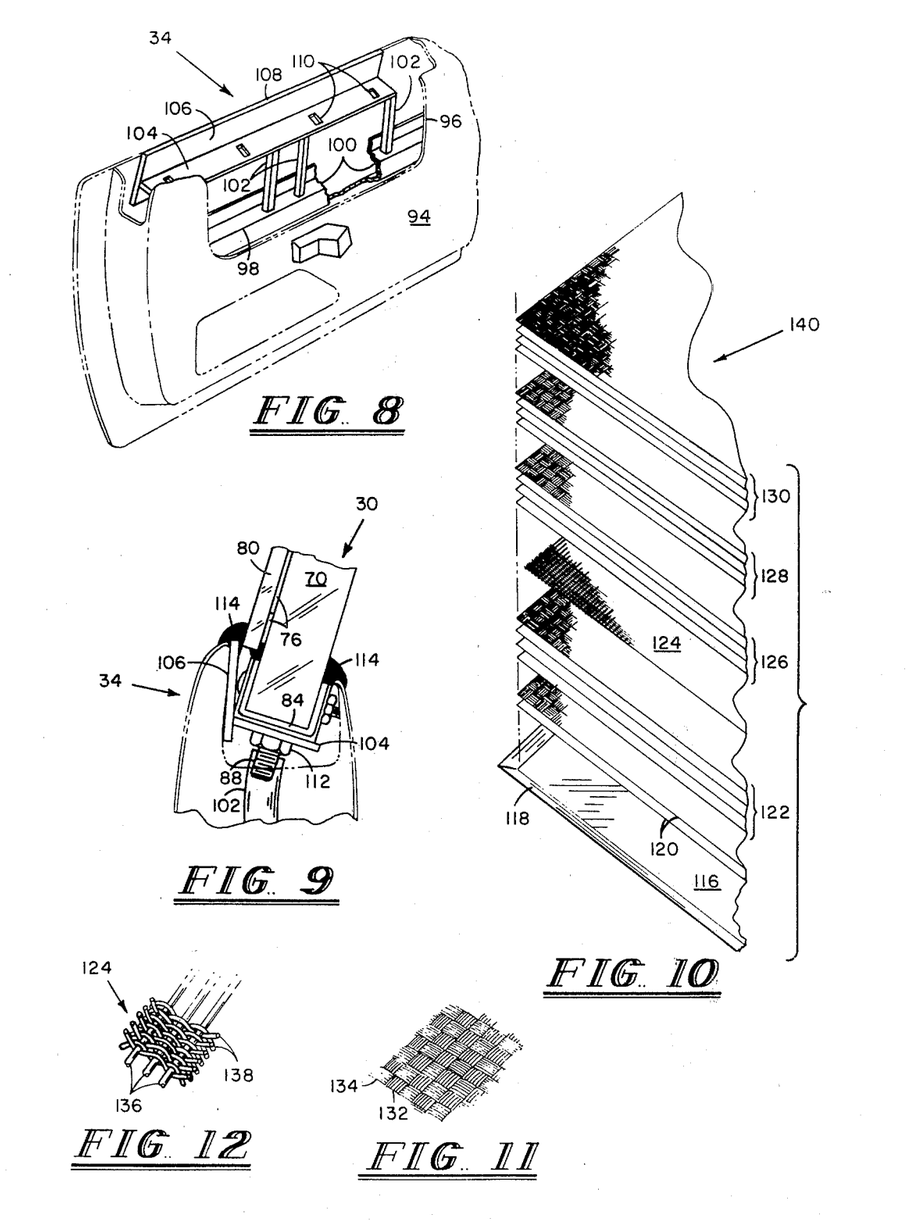
FIG. 8 is an inside perspective view of a door for the automobile shown in FIG. 1 after stripping the interior, removing the window mechanisms, and installing supports for a new bulletproof window.
FIG. 9 is a partial elevated sectional view of FIG. 8 after installation of the bulletproof window.
FIG. 10 is an exploded partial perspective view showing construction of the lightweight woven polyglass material as rigidly formed with a resin-catalyst mixture.
FIG. 11 is an enlarged partial perspective view illustrating weave of a single sheet of the lightweight woven polyglass material.
FIG. 12 is an enlarged partial perspective view of the woven steel embedded in the rigidly formed woven polyglass.

Referring to FIGS. 8 and 9 in combination, the first step in retrofitting automobile 20 for armor is to strip the interior from the automobile. In the doors, such as front door 34 shown in FIG. 8, the window mechanism is removed and an upper portion of the internal wall 94 of the door 34 is cut away as shown by opening 96. A cross brace 98 is normally contained inside of the door of most automobiles. However, in the model shown in FIG. 8, the cross brace 98 has a considerable width, therefore a portion of the cross brace 98 is cut out as shown by reference numeral 100 to allow room for a gun port as will be subsequently explained in more detail.

Extending upward from cross brace 98 are window support posts 102 that connect to the cross brace 98 by any suitable means, such as welding. The upper portion of the window support post 102 connects to an elongated plate 104 inside of front door 34, which elongated plate 104 is mounted at a slight incline as shown in FIG. 9. The elongated plate 104 is rigidly attached to a vertical side plate 106 that extends to the top 108 of the door 34.

The front door window 30 as shown in FIGS. 6 and 7 is secured in position by inserting the mounting bolts 88 inside of slots 110 provided in elongated plate 104 shown in FIGS. 8 and 9. Nuts 112 threadably connected to mounting bolts 88 secure the window 30 in position. Molding 114 is positioned around the edges of the window 30 in the conventional manner.

Referring now to FIG. 10 of the drawings, the woven multi-layer fiberglass material is shown in an exploded partial perspective view illustrating the numerous layers and method for manufacturing in a rigid assembly using a resin-catalyst mixture. In the description of FIG. 10, a typical method of making the rigid woven fiberglass is described. A tray 116 is shown with an upwardly flared outer edge 118 to retain the resin-catalyst mixture therein. Two layers 120 of woven polyglass are laid inside of tray 116. Approximately $6\frac{1}{2}$ pounds of mixture is spread uniformly over the two layers of woven polyglass. Next, four layers of woven polyglass 122 are applied on top of the first two layers 120. Again, approximately $6\frac{1}{2}$ pounds of mixture are applied to the four layers 122. Next, as an optional feature that could increase the bullet resistant strength of the rigidly formed woven polyglass is a sheet of woven steel 124 as will be explained in more detail subsequently. The woven steel 124 stops short of the edges of the four layers of woven polyglass 122 to allow bonding with subsequent layers around the outer edges. Next, four more layers of woven polyglass 126 are placed on top of the woven steel 124, which layers 126 extend beyond the edges of the woven steel 124 to bond with the edges of the four layers 122. Again, approximately $6\frac{1}{2}$ pounds of mixture is uniformly applied to the four layers 126. Again, four layers of woven polyglass 128 are placed on top of the layers 126 and $6\frac{1}{2}$ pounds more of mixture applied thereto. Finally, the last four layers of woven polyglass 130 is placed on top of the four preceding layers 128.

All of the layers 120, 122, 124, 126, 128 and 130 are inserted inside of a machine with tray 116 wherein the layers of polyglass and resin-catalyst mixture are heated and compressed to form a rigid woven polyglass material. To prevent sticking either to the tray 116 or to the machine, it may be necessary to have an upper and lower layer of plastic enclosing the various layers of polyglass woven steel and resin-catalyst mixture. Pressure and heat are applied to the layers of polyglass and resin to cause a uniform distribution of the resin-catalyst throughout the polyglass material. As the mixture hardens, a rigid woven polyglass sheet is formed.

Referring now to FIG. 11, an enlarged partial sectional view of the woven polyglass material is shown. A first plurality of strands of fiberglass forms a first ribbon 132 that extends in a first direction. A second plurality of strands of fiberglass forms a second ribbon 134 that extends in a second direction perpendicular to the first ribbon 132. By interweaving a plurality of first and second ribbons 132 and 132 as shown in FIG. 11, a sheet of flat, flexible polyglass material is formed. A typical such flexible woven polyglass sheet is manufactured and sold by Fiber Glass Industries Incorporated and called Woven Glass Roving Style 775.

Referring now to FIG. 12, the woven steel 124 is shown wherein large steel wires 136 extend parallel in a first plane. Smaller gauge steel wires 138 are interwoven in the same plane about the large steel wires 136 to form a woven steel screen. A typical example of such woven steel 124 is manufactured by Sherwatt Wire Cloth Company, Inc. and called Plain Steel Carbon Wire Cloth, 24 by 110 mesh. The woven steel 124 is an optional feature that may or may not be included within the rigidly formed woven polyglass. The steel screen 124 helps disperse and fragmentize a projectile so that its impact will be spread over a larger area thereby considerably increasing the strength of the woven polyglass material 140 shown in FIG. 10 upon rigidly forming as described hereinabove.

Two different types of flexible multi-layer material are used in the armoring of the automobile 20. One is a common ballistic nylon and the other is a ballistic material sold under the trademark Kevlar. The various layers are cut and stacked one upon the other, and sewn together as shown in the pictorial view of FIG. 14. Assume in FIG. 14 the material being sewn together is ballistic nylon 142. The outer edge of the ballistic nylon 142 is sewn together by stitching 144 around its outer perimeter. Next, cross-stitching is periodically spaced along the sheet of multi-layer ballistic nylon 142. Longitudinal stitching 148 is sewn in the ballistic nylon 142 perpendicular to the cross-stitching 146. Finally, patterns are marked on the sheet of ballistic nylon 142 to be used in the armor of the automobile 20. The patterns are then cut and the industrial sewing machine 150 is used to sew the outer perimeter of the various patterns. In the sewing of the ballistic nylon 142, as well as the Kevlar, the stitch spacing and the tightness of the stitch has to be fairly accurately controlled to obtain the optimum tightness and spacing. By obtaining the optimum tightness and spacing in the stitches, the resistance to projectiles therethrough is increased. For the ballistic nylon, the optimum spacing between stitches varies between a range of ⅛ inch to ¼ inch apart. The tightness of the stitching should be between a medium-to-firm tightness. The stitching should be repetitive in cross stitched squares between 4 to 6 inches per side.

The Kevlar is formed into multiple layers basically the same as the ballistic nylon. However, the spacing between stitches of the Kevlar for optimum strength should be between ⅛ to ¼ inch. The tightness of the stitching should be between a medium-to-firm tightness. The stitching should be repetitive in cross stitched squares between 4 to 6 inches per side.

Figures 13, 14, 15, 16:
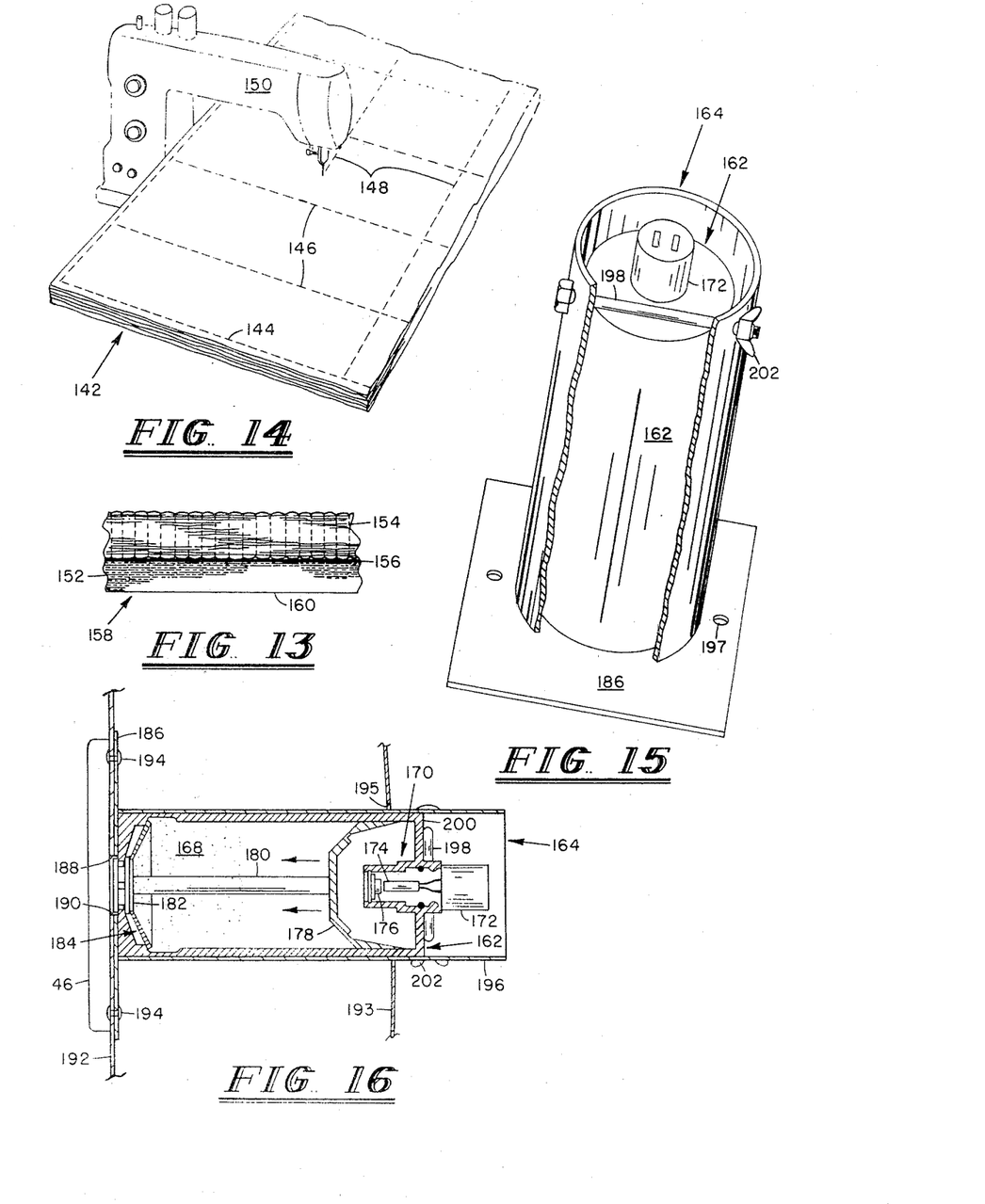
FIG. 13 is a cross-sectional view of the Kevlar as attached to the rigidly formed polyglass.
FIG. 14 is a partial perspective view illustrating the formation of multi-layer Kevlar or ballistic nylon.
FIG. 15 is a perspective view of a tear gas cannister installation system with a portion sectionalized.
FIG. 16 is a sectional view along the longitudinal axis of the tear gas cannister shown in FIG. 15.

The ballistic nylon, which is bulkier than the Kevlar, is normally used in the floorboard or floor panel 24 and in the top 22 as part of the headliner where space is not as critical. In the doors of the automobile 20 or in the kick panels, the Kevlar is used normally in combination with 18-ply woven rigid polyglass. However, in certain situations, a lower ply of woven rigid polyglass may be used with a resultant reduction and projectile penetration strength. Assume, for example, that the door of an automobile should have an 18-ply woven rigid polyglass 152 (without the woven steel 124) as shown in FIG. 13. Next, assume a 24-ply Kevlar 154 is necessary to obtain the desired resistant strength to bullet penetration. A 24-ply Kevlar 154 is bonded to the 18-ply woven rigid polyglass 152 by a suitable bonding material, such as silicone 156. For additional strength around the edges, pop rivets may be inserted through the entire protective sheet 158, especially around the outer edges thereof, and periodically throughout the center portion.

Since the Kevlar deteriorates if it comes in contact with moisture, the entire protective sheet 158 is encapsulated in a water resistant material, such as a thin layer of plastic. Assume that a bullet is fired into the side of automobile 20 so that it strikes the protective sheet 158 approximately perpendicular to surface 160. The 18-ply woven rigid polyglass 152 would tend to flatten and disperse the projectile with the 24-ply Kevlar 154 catching any remaining fragments or portions of the projectile.

Referring to FIGS. 15 and 16 in combination,, a tear gas distribution system located behind the reflectors 46 of the automobile 20 shown in FIG. 1 is shown in more detail. A tear gas cannister 162 has a powdered tear gas substance 168 contained in the main chamber thereof. The firing portion 170 of the tear gas cannister 162 has a female electrical plug 172 which connects to an electrical match 174 which creates an arc thereacross. Firing cap 176, which may consist of black powder, is ignited thereby driving the piston 178 in the direction indicated by the arrows. The piston rod 180 forces the pop cap 182 off the end 184 of the cannister 162. Also, the reflector 46 shown in FIG. 1 is blown off the side of the vehicle 20. The movement of the piston towards end 184 disperses the powdered tear gas substance 168 outwardly from the armored vehicle 20.

To secure the tear gas cannister 162 in position, it is contained in a tear gas cannister housing 164 which has a flat plate 186 with an opening 188, that coincides with opening 190 of the fender of the automobile 20. The flat plate 186 is secured to the fender 192 of the automobile 20 by means of rivets 194 extending through holes 197 of the flat plate 186. The rivets 194 are hidden behind the reflectors 46. The tear gas cannister 162 is secured in position by means of an open ended cylinder 196 secured to the flat plate 186 by any suitable means, such as welding. Also, bolt 198 extends across the open ended cylinder 196, offset from the center thereof, in a close abutting relationship with the end shoulder 200 of the tear gas cannister 162. The bolt 198 is secured in position by wing nut 202. Internal well 193 provides additional support for the rear portion of the housing 164 which is received inside of opening 195 in a close fit relationship.

By an electrical connection from the female plug 172 to the control panel of the automobile 20, the tear gas cannister 162 can be fired thereby dispensing the powdered tear gas substance 168 out the openings 188 and 190 for dispersal radially from the automobile 20. Any number of tear gas cannisters would be contained on an automobile with different orders of firing, but in this preferred embodiment, it is envisioned that one tear gas cannister would be contained in each fender and that diagonally opposing tear gas cannisters would be simultaneously fired.

Previously in the description of FIG. 8, a cutout portion 100 of cross brace 98 was described for front door 34. The cutout portion allows a gun port to be installed. The gun port shown in FIG. 18 has an opening 204 in the interior panel 206 normally covered by covering block 208 that may be easily removed by tab 210. Another hole 212 adjacent to hole 204 is cut in the protective shield 158 that includes the Kevlar 154 and the rigid woven polyglass 152. A protective flap 214 formed from a multi-ply woven rigid polyglass is pivotedly mounted on the protective shield 158 by a spring-loaded hinge 216.

Figures 17, 18:
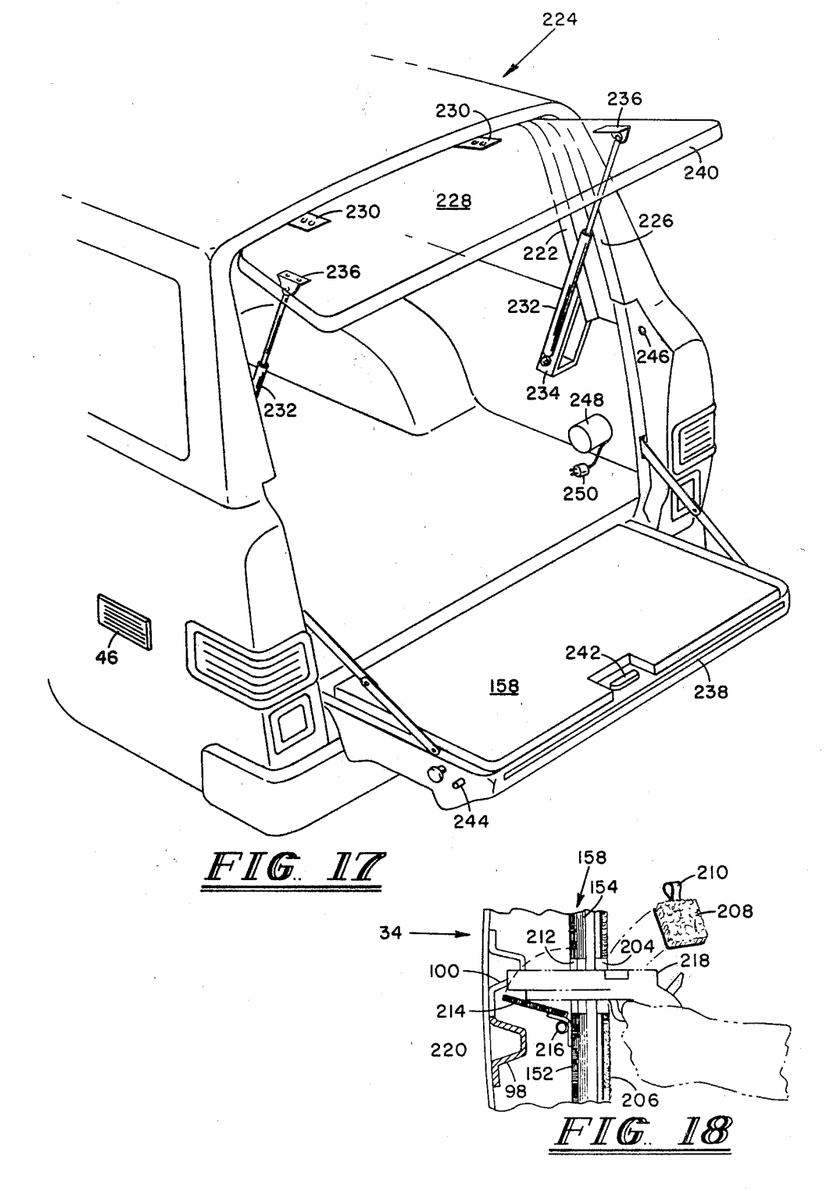
FIG. 17 is a partial perspective view indicating the installation of armor in the rear of an automobile, such as a Jeep Wagoner.
FIG. 18 is a partial elevated sectional view of the door illustrating use of gun parts.

By a quick removal of the covering block 208 by tap 210, gun 218 can be inserted through openings 204 and 212 thereby pushing the protective flap 214 out of the way and subsequently fired through the outer skin 220 of the door 34. The skin 220 will not substantially interfere with the projectile path of a bullet from a normal hand gun in a close attack situation.

Referring now to FIG. 17, the method of securing armor for the rear portion of a vehicle, such as a Jeep Wagoner or International Scout, is shown. In prior designs, considerable problems have occurred in creating a good seal between the rear window and the frame of the automobile. In the present design, it is envisioned that the seal of the automobile will not be disturbed with all armor being contained inside thereof. An additional frame 222 for the vehicle 224 is mounted adjacent to the normal frame opening 226. A Lexgard laminate is pivotally mounted inside of frame 222 by means of hinges 230 so that it will open outward through normal frame opening 226. Spring loaded cylinders 232 are attached by special bracket supports 234 and by a mounting plate 236 to aid in the opening of the protective Lexgard laminate 228. The lower edge 240 of the Lexgard laminate 228 extends below the upper portion of the tailgate 238, which has a retractable rear window. The tailgate 238 is protected by a protective sheet 158 mounted thereto. Further, to prevent an individual from breaking the rear window and opening the tailgate 238 by means of handle 242, deadbolt locks 244 are electrically operated by solenoids to extend into holes 246.

The tear gas cannister 162 can be seen as mounted inside of decorative cover 248, which covers the tear gas cannister 262 and tear gas cannister housing 264. For illustrative purposes, the electrical connection 250 thereto is shown outside the decorative cover 248.

The vehicle 224 contains normal protective armor as previously described in conjunction with automobile 20, such as multiple-ply ballistic nylon in the floor and headliner, Lexgard laminate in the side windows, and protective sheets 158 in the side panels. Wheel wells may be protected by any of a number of ways, such as multi-layers of ballistic nylon, Kevlar, and/or rigid woven fiberglass.

Figure 5:
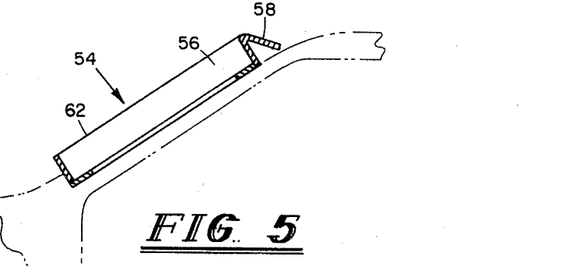
FIG. 5 is a partial sectional perspective view of the frame shown in FIG. 2 for front and rear windows.
Figure 19:
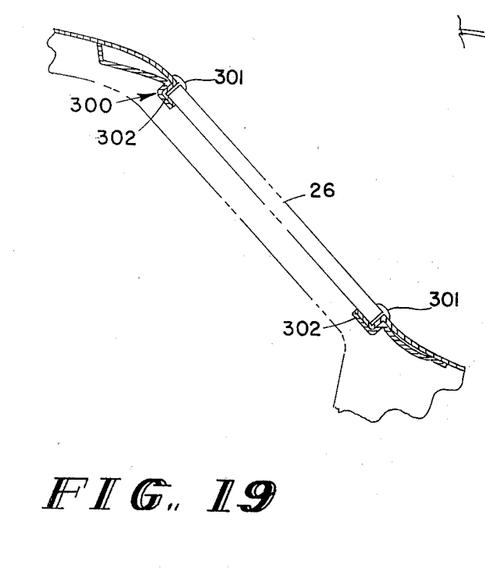
FIG. 19 is a cross-sectional view of a windshield as installed in an ordinary automobile.

Another method of installing bulletproof front and/or rear windshields in an automobile different from that shown and described in reference to FIGS. 2 and 5 is illustrated in FIGS. 19-22. As shown in FIG. 19, an ordinary automobile 20 is standardly equipped with a mechanism 300 to retain a windshield 26 in position. The part of mechanism 300 that actually engages windshield 26 is lip 302. The windshield 26 is a conventional safety glass type found in conventional automobiles as previously discussed.

Figure 20:
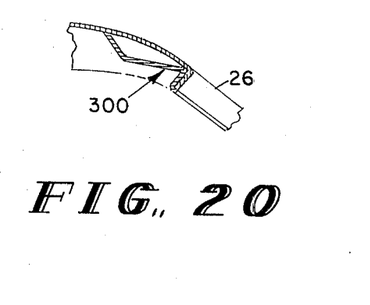
FIG. 20 is a cross-sectional view of the mechanism that ordinarily holds a windshield in position, the lip of the machanism having been filed away or ground or cut off.
Figure 21:
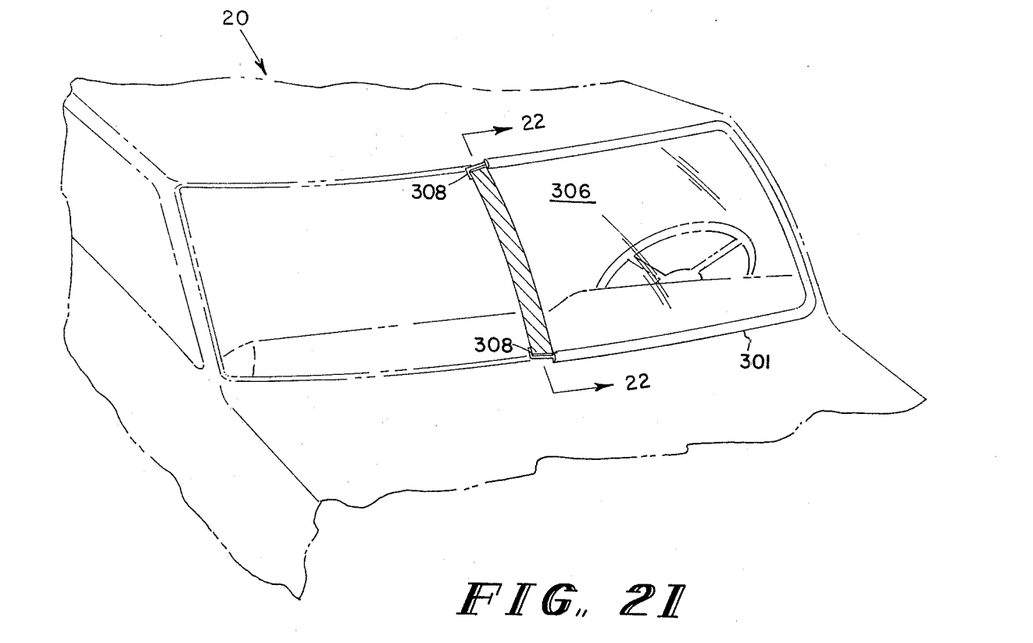
FIG. 21 is a fragmented perspective view of the front of an automobile showing a newly installed bulletproof windshield partially cut away.
Figure 22:
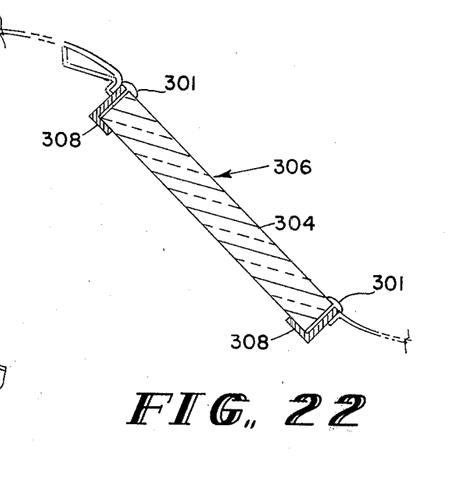
FIG. 22 is a cross-sectional view of the windshield of FIG. 21 taken along lines 22—22.

To equip an ordinary automobile with bulletproof glass, the conventional safety glass 26 in molding 301 of FIG. 19 are removed and lip 302 is abolished as shown in FIG. 20 by any means convenient, such as cutting, grinding or sawing, for example. A new lip 308 large enough to retain bulletproof windshield 306 is then installed, for example by welding as illustrated in FIG. 22. With this new lip 308, the exterior surface 304 of bulletproof windshield 306 maintains the same contour as when the ordinary safety glass windshield 26 was in place. This contour can be more easily seen in FIG. 22 with the molding 3d reinstalled.

Installation of bulletproof windshield 306 by the method described immediately above permits several time consuming and costly steps to be eliminated in the installation procedure when compared with the method described in reference to FIGS. 2 and 5. However, both methods of fitting an ordinary automobile with front and/or rear bulletproof windshields equally provide an automobile with substantial armor protection. While one method brings the exterior surface of the bulletproof windshield forward relative to the exterior surface of the ordinary safety glass windshield, the second method has the bulletproof windshield exterior surface located at the same level as the ordinary safety glass windshield.

The above described principles can also be used to install lightweight armor in new automobiles. Instead of rebuilding the frames of the windows for the thicker glass, the automobile as orginally manufactured could receive the thicker polycarbon laminate or Lexgard laminate with either the safety plate or bullet resistant glass. As orginally assembled, the multi-layer ballistic nylon or Kevlar could be installed with the rigid woven polyglass to provide from the factory a lightweight armored vehicle. Optional features, such as the tear gas dispersal system, could be part of the original automobile thereby not requiring retrofitting.

I claim:

1. A method of installing bulletproof front and/or rear windows of an aromored automobile consisting of the following steps:
   removing original windows and molding;
   altering the window frame area to accommodate a thicker depth of said bulletproof window by the following;
   removing a first lip of a mechanism that retains said original windows in position; and
   replacing said first lip with a second lip that will provide said thicker depth to retain said bulletproof window in position;
   installing said bulletproof window in said altered window frame area; and
   restoring said window frame with said bulletproof window in position so said armored automobile appears as an ordinary automobile.

2. The method of claim 1 wherein said second lip is welded into position to retain said bulletproof window.

3. A method of installing bulletproof front and/or rear windows of an armored automobile consisting of the following steps:
   removing original windows and molding;
   altering the window frame area to accommodate a thicker depth of said bulletproof window by the following;
   forming a new window frame that extends outward from said original window frame, said new window frame having sufficient thickness to accommodate said bulletproof window therein; and
   securing said new window frame to said original window frame;
   installing said bulletproof window in said altered window frame area; and
   restoring said window frame area with said bulletproof window in position so said armored automobile appears as an ordinary automobile.

4. The method of claim 3 wherein restoring said window frame area with said bulletproof window installed comprises:

reforming body portions of said armored automobile adjacent said new window frame to conform to the adjoining original contour of said armored automobile; and repainting damaged portions of said armored automobile.

5. The method of claim 4 wherein forming said new window frame comprises shaping acute angle iron to form said window frame having first and second flanges, said first flange being parallel and contiguous with edges of said bulletproof window and said second flange being notched to aid forming of curved portions of said new window frame.

6. A method of installing bulletproof front and/or rear windows of an armored automobile consisting of the following steps:

removing original windows and molding;

abolishing the means whereby said original windows are retained;

replacing said original retaining means with a second retaining means of sufficient depth to accommodate and retain bulletproof windows in position; and installing said bulletproof window in said second retaining means and reinstalling said molding, said bulletproof window when installed allowing the original contour of said armored automobile to be maintained so said armored automobile appears as an ordinary automobile.

7. The method of claim 6 wherein said original retaining means are abolished by cutting lips sufficient to retain said original windows and said second retaining means are secured by welding a second set of lips sufficient to retain said bulletproof windows.

8. A method of installing bulletproof front and/or rear windows of an armored automobile yet appear as an ordinary automobile consisting of the following steps:

removing original windows and molding;

forming a new window frame from acute angle iron to extend outward from an original window frame;

welding said new window frame to said original window frame to accomodate increased thickness of said bulletproof window, first flange of said acute angle iron being parallel and contiguous with edges of said bulletproof window;

reforming body portions of said armored automobile adjacent to said new window frame to appear contoured with design of said armored automobile;

repainting damaged portions of said armored automobile; and installing bulletproof window and reinstalling molding.

9. The method of installing bulletproof windows in an armored automobile as given in claim 8 includes as part of said forming step notching a second flange of said acute angle iron to aid forming of curved portions of said new window frame, said notches being welded across during said welding step.

* * * * *